United States Patent
Liu et al.

(10) Patent No.: US 12,299,744 B2
(45) Date of Patent: May 13, 2025

(54) SYSTEM AND METHOD FOR SMART MATCHING SYSTEM BY USING ONLINE LEARNING

(71) Applicant: Edward D. Jones & Co., L.P., St Louis, MO (US)

(72) Inventors: Yimin Liu, St Louis, MO (US); Elizabeth A Ewanio, St Louis, MO (US); Kelly Marie Day, St Louis, MO (US); Matthew Scott Doran, St Louis, MO (US)

(*) Notice: Subject to any disclaimer, the term of this patent is extended or adjusted under 35 U.S.C. 154(b) by 0 days.

(21) Appl. No.: 15/997,129

(22) Filed: Jun. 4, 2018

(65) Prior Publication Data

US 2018/0285975 A1 Oct. 4, 2018

(51) Int. Cl.
| | |
|---|---|
| G06Q 40/06 | (2012.01) |
| G06F 15/76 | (2006.01) |
| G06F 16/335 | (2019.01) |
| G06F 16/9535 | (2019.01) |
| G06F 18/22 | (2023.01) |
| G06N 20/00 | (2019.01) |

(52) U.S. Cl.
CPC .............. *G06Q 40/06* (2013.01); *G06F 15/76* (2013.01); *G06F 16/337* (2019.01); *G06F 16/9535* (2019.01); *G06F 18/22* (2023.01); *G06N 20/00* (2019.01)

(58) Field of Classification Search
CPC ...... G06F 16/9535; G06F 16/33; G06F 15/76; G06F 16/337; G06F 18/22; G06K 9/6201; G06Q 40/06; G06N 20/00

USPC ......................................................... 707/732
See application file for complete search history.

(56) References Cited

U.S. PATENT DOCUMENTS

| | | | | |
|---|---|---|---|---|
| 10,592,868 | B1* | 3/2020 | Murphy | G06Q 10/1095 |
| 11,037,209 | B2* | 6/2021 | Hayden | G06Q 30/0185 |
| 2009/0281988 | A1* | 11/2009 | Yoo | G06Q 10/10 |
| 2010/0268669 | A1* | 10/2010 | Anthony-Hoppe | G06Q 40/06 705/36 R |
| 2012/0296790 | A1* | 11/2012 | Robb | G06F 9/54 705/35 |
| 2014/0279269 | A1* | 9/2014 | Brantley | G06Q 30/0635 705/26.81 |
| 2014/0337094 | A1* | 11/2014 | Jain | H04L 67/16 705/7.29 |
| 2018/0115645 | A1* | 4/2018 | Iyer | G06Q 10/063112 |

FOREIGN PATENT DOCUMENTS

| | | | | |
|---|---|---|---|---|
| CA | 3115172 | A1 * | 4/2020 | G06N 20/00 |

\* cited by examiner

*Primary Examiner* — James E Richardson

(57) ABSTRACT

System and methods are disclosed to perform operations including communicatively coupling a plurality of client devices that are accessible by a user to enable the user to communicate with the processor. Receiving a first set of information associated with a user and a second set of information associated with financial advisors as a function of the first set of information. Matching a user with a financial advisor and generating performance metrics with the selected financial advisor to train the matching algorithm to modify the financial advisor information as a function of the performance metrics.

20 Claims, 5 Drawing Sheets

SYSTEM AND METHOD FOR SMART MATCHING SYSTEM BY USING ONLINE LEARNING

FIELD

The present disclosure generally relates to the technical field of matching a financial advisor with a potential client. More specifically, the present disclosure is directed to systems and methods for matching a financial advisor with a client based on the collection of data from multiple sources, deploying an intelligent matching algorithm, monitoring client and financial advisor interactions, and providing real time statistics and interfaces for optimizing the client experience utilizing a plurality of success factors.

BACKGROUND

Identifying service professionals is and has been a persistent need across various industries for potential clients seeking assistance from qualified individuals. Identifying service professionals with financial and investment expertise is particularly challenging because the needs of respective clients may vary dramatically and the expertise and effectiveness of qualified professionals may vary as well. Traditional methods of matching or pairing a potential client with a financial professional are currently inadequate for achieving an optimal fit between a client's need and a professional advisor's expertise and effectiveness.

Traditional methods of matching a financial advisor with a potential client include referrals from family or friends, advertisements, or professional and/or social organization relationships. These traditional methods are largely impersonal in that they do not align or improve the fit, which could be defined as business objectives, between a client's need and a professional advisor's expertise. Specifically, the client's financial advising needs are never addressed with specificity in these traditional types of matching methods. Furthermore, even where a particular financial advisor has relevant experience for the client's financial advising needs, there may be other more specialized individuals identified using success factors (e.g., client retention, amount of assets under care, etc.) that could potentially yield a better outcome in terms of market success and client satisfaction.

Additional methods of matching a financial advisor may include various referral-matching systems. Referral-matching systems attempt to pair financial advisors with potential clients by receiving a client intake form via a paper questionnaire or electronic means through a website. This type of traditional referral-matching method may provide useful information to the financial advisor on the particular needs of a customer. However, the financial advisor is typically not chosen or aligned with the client's needs. Furthermore, this approach does not consider the geographic location of the client or the particular expertise of the financial advisor. Even under traditional referral-matching methods, an in person meeting is typically required to establish a level of comfortability between the financial advisor and the client. Arranging an in person meeting can be time consuming based on the scheduling conflicts and geographic locations of the financial advisor and client.

As the internet has grown in popularity, several current methods have attempted to integrate financial advisor matching systems with referral services. For example, clients may utilize the internet to narrow the focus of a search for financial advisors based on the client's need. In some systems, a financial advisor can be identified utilizing a database of potential advisors based on the client's need and/or geographic location. An example of this type of system includes U.S. Pat. Nos. 7,752,054 and 7,962,347. In these systems, the database is static in that it does not reflect feedback received based on previous advisor matching results. In other words, the database of potential financial advisors is not updated to include information regarding a new client creation and client experience with a respective selected financial advisor. Moreover, current solutions only provide specific solutions (e.g., a financial advisor matching method), but fail to integrate systems that match prospective clients with financial advisors while also monitoring the interactions through interfaces and automatically supervising/updating the matching experience based on the client's experience.

There remains a persistent need to provide a holistic system for matching a potential client with a financial advisor based on success factors, which could be the client's need and satisfaction as well as the financial advisor's expertise and experience. Moreover, a comprehensive platform is necessary to link clients with branch offices so that a respective client's experience can be improved over time through feedback and updating the algorithm used to match clients with financial advisors. Finally, performance metrics identified from a client's experience may be used to develop marketing strategies, improve training and achieve overall success of financial advisors throughout the organization utilizing a comprehensive monitoring system between branch offices and the home office.

The success of financial advisor organizations and businesses, which provide advising services to their clients, is largely dependent on the successful interactions and initial matching with a respective financial advisor. Because this step is so critical to the organizations business model, there is a constant need to optimize and improve the method for identifying and matching a financial advisor with a potential client. Providing a system that continually improves the matching and interaction between the financial advisor and client will improve the overall quality and effectiveness of financial advisors within the organization, reach business objectives of the organization, monitor the progress, evaluate the performance of financial advisors and improve prospective clients' experience.

SUMMARY

In various embodiments, a non-transitory computer readable medium having instructions stored thereon is disclosed. The instructions, when executed by a processor, cause the system to perform operations including communicatively couple to a plurality of client devices that are accessible by a user to enable the user to communicate with the processor; receive a first request from one of the plurality of client devices, the request being a request for a financial advisor; receive a first set of information associated with the user of the client device making the request; receive a second set of information associated with financial advisors as a function of the first set of information; identify using a matching algorithm a plurality of financial advisors as a function of the first and second sets of information; display the identified plurality of financial advisors; receive a selection for a financial advisor among the displayed plurality of financial advisors from the user; receive a third set of information associated with the selected financial advisor; and train the matching algorithm to modify the second set of financial advisor information as a function of the third set of information.

In various embodiments, a system comprising a server is disclosed. The server is configured to communicatively couple to a plurality of client devices that are accessible by a user to enable the user to communicate with the server; receive a request from one of the plurality of client devices, the request being a request by a user for a financial advisor; receive a first set of information from associated with the user of the client device making the request; receive a second set of information associated with financial advisors as a function of the first set of information; identify using a matching algorithm, a plurality of financial advisors as a function of the first and second sets of information; display the identified plurality of financial advisors; receive a selection for a financial advisor among the displayed plurality of financial advisors from the user; in response to receiving a selection for a financial advisor: display for selection a business location associated with the selected financial advisor; display available meeting times associated with a calendar of the selected financial advisor; guide the at least one user to schedule an appointment or make a phone call on the client device; receive a third set of information associated with the selected financial advisor; and train the matching algorithm to modify the first set of financial information based on the second set of user information and second set of financial advisor information.

In various embodiments, a method is disclosed. The method includes the steps of receiving a request from one of a plurality of client devices that are accessible by a user, the request being a request for a financial advisor; receiving a first set of information associated with the user of the client device making the request; receiving a second set of information associated with financial advisors as a function of the first set of information; identifying using a matching algorithm a plurality of financial advisors as a function of the first and second sets of information; displaying the identified plurality of financial advisors; receiving a selection for a financial advisor among the displayed plurality of financial advisors from the user; receiving a third set of information associated with the selected financial advisor; and training the matching algorithm to modify the second set of financial advisor information as a function of the third set of information.

BRIEF DESCRIPTION OF THE DRAWINGS

Various aspects of the present disclosure will be or become apparent to one with skill in the art by reference to the following detailed description when considered in connection with the accompanying exemplary non-limiting embodiments, in which.

DETAILED DESCRIPTION

This description of the exemplary embodiments is intended to be read in connection with the accompanying drawings, which are to be considered part of the entire written description. The use of the singular includes the plural unless specifically stated otherwise. The use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

The following description is provided as an enabling teaching of a representative set of examples. Many changes can be made to the embodiments described herein while still obtaining beneficial results. Some of the desired benefits discussed below can be obtained by selecting some of the features discussed herein without utilizing other features. Accordingly, many modifications and adaptations, as well as subsets of the features described herein are possible and can even be desirable in certain circumstances. Thus, the following description is provided as illustrative and is not limiting.

As used herein, use of a singular article such as "a," "an" and "the" is not intended to exclude pluralities of the article's object unless the context clearly and unambiguously dictates otherwise A comprehensive financial advisor system and methods are provided in the present disclosure. As discussed throughout this specification, the financial advisor system and methods advantageously integrate smart devices, backend service and cloud information to collect data from multiple sources, deploy intelligent matching algorithms, and offer user-friendly interfaces for financial advisors, clients and asset management service providers to use. Furthermore, the system and methods describe herein, constantly monitor users' feedback, update the matching algorithm and intelligently improve the matching results over time. In various embodiments, financial advisors and potential clients can use the system and methods described below to set up appointments and meetings using client devices. In some embodiments, a machine learning matching algorithm is used to assist in matching potential clients with financial advisors, optimizing the client experience utilizing success factors (e.g., highest client satisfaction, lowest client attrition rates, assets under care, etc.), enabling the system to adjust the matching algorithm, which advantageously contributes to forming better long-term relationships and increasing positive outcomes.

System Overview

Figure 1A:
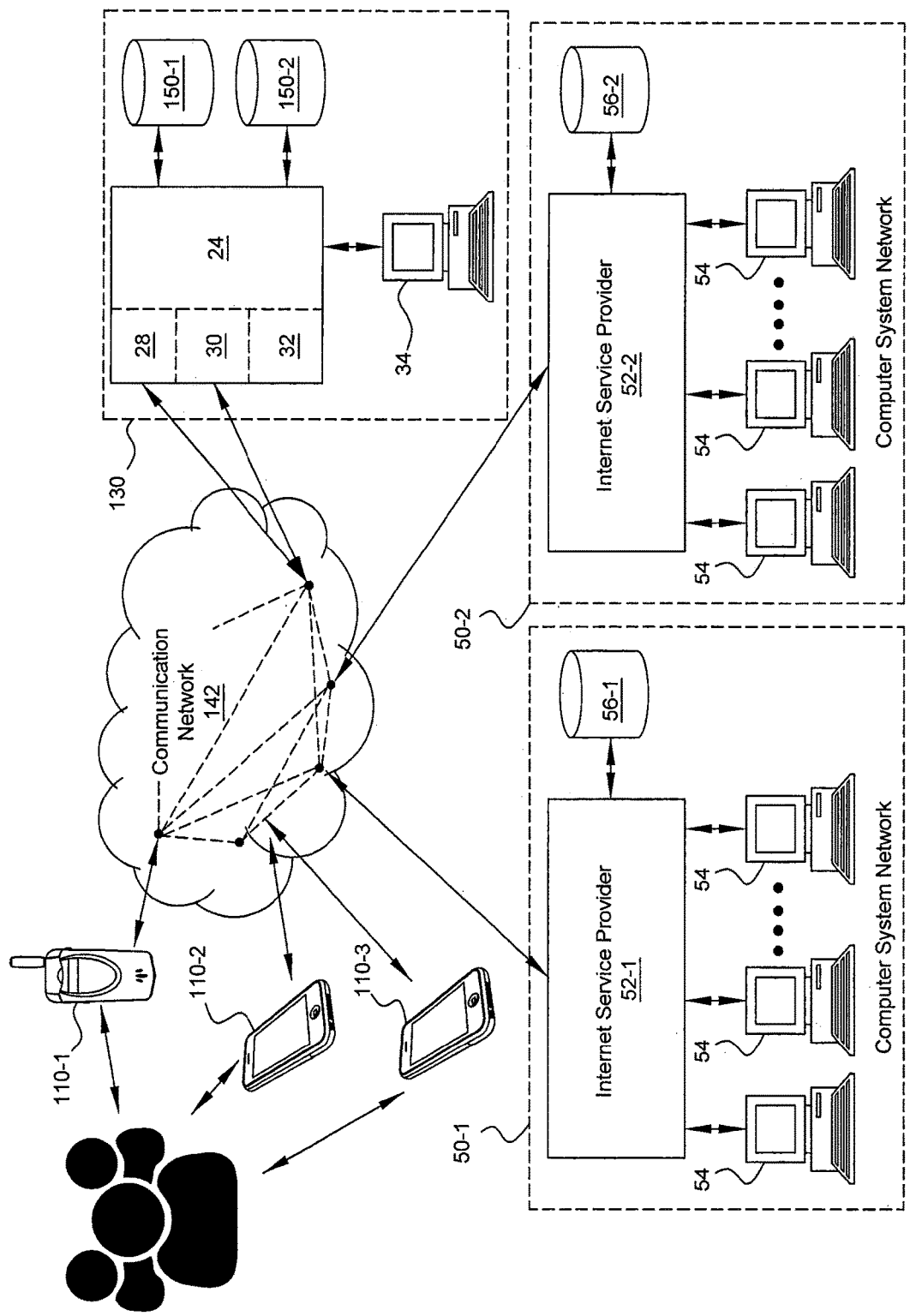
FIG. 1A illustrates one example of a system in accordance with some embodiments of the present disclosure.

FIG. 1A depicts one example of a system 100 in which a plurality of client devices 110-1, 110-2, and 110-3 (collectively "client devices 110") are connected via communication network 142 to one or more computer system networks 50-1, 50-2 ("computer networks 50"), and to management server 130. Communication network 142 may be a wide area network ("WAN"), a local area network ("LAN"), personal area network ("PAN"), or the like. In one embodiment, communication network 142 is the Internet and client devices 110 are online. "Online" may mean connecting to or accessing source data or information from a location remote from other devices or networks coupled to communication network 142.

Management server 130 includes a processing unit 24 coupled to one or more data storage units 150-1, 150-2 (collectively referred to as "database management system 150" or "DBMS 150"). The processing unit 24, in some embodiments is configured to provide front-end graphical user interfaces ("GUI") (e. financial advisor GUI 28 and client users GUI 30), and a back-end or administrative graphical user interface or portal 32 to one or more remote computers 54 or to one or more local computers 34. In some embodiments, a financial advisor interface (not shown) is provided that accesses management server 130 via GUI 28. The GUIs can take the form of, for example, a webpage that is displayed using a browser program local to remote computers 54 or to one or more local computers 34. It is understood that the system 100 may be implemented on one or more computers, servers, or other computing devices. In some embodiments, the GUI may be displayed on client devices 110 via a software application. For example, system 100 may include additional servers programmed or partitioned based on permitted access to data stored in DBMS 150. As used herein, "portal" is not limited to general-purpose Internet portals, such as YAHOO! or GOOGLE but also includes GUIs that are of interest to specific, limited audiences and that provide the party access to a plurality of different kinds of related or unrelated information, links and tools as described below. "Webpage" and "website" may be used interchangeably herein.

Remote computers 54 may be part of a computer system network 50-1, 50-2 and gain access to communication network 142 through an Internet service provider ("ISP") 52-1, 52-2 ("ISPs 52"). Client devices 110 may gain access to communications network 142 through a wireless cellular communication network, a WAN hotspot, or through a wired or wireless connection with a computer as will be understood by one skilled in the art. Financial advisors, client users and supervisory personnel, as will be described below, may use remote computers 54 and/or client devices 110 to gain access to system 100.

In one embodiment, client devices 110 includes any mobile device capable of transmitting and receiving wireless signals. Examples of mobile instruments include, but are not limited to, mobile or cellular phones, smart phones. personal digital assistants ("PDAs"), laptop computers, tablet computers, music players, and e-readers, to name a few possible devices.

Figure 1B:
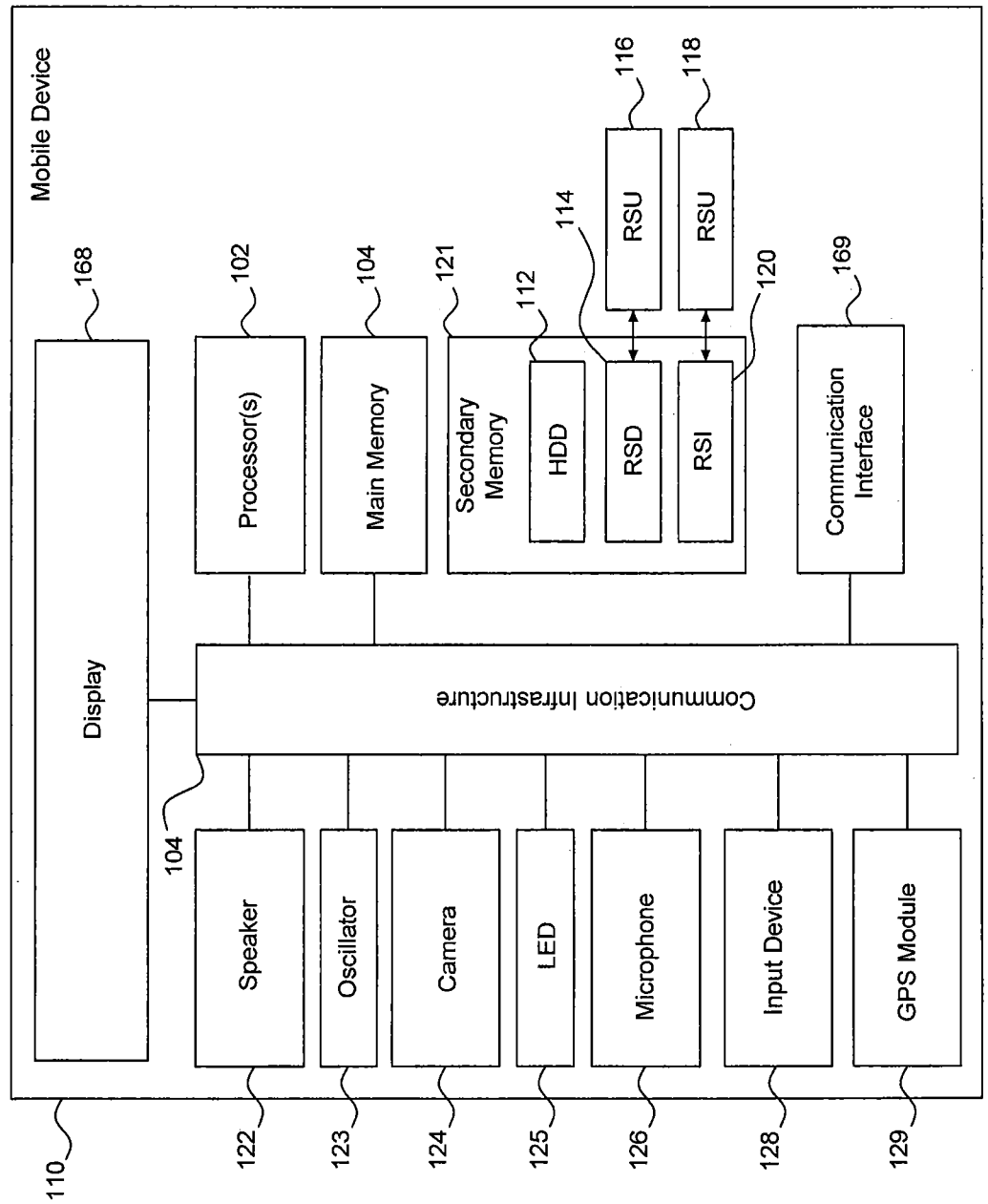
FIG. 1B illustrates one example of an architecture of a mobile device in accordance with some embodiments of the present disclosure.

FIG. 1B is a block diagram of one example of an architecture of client device 110. As shown in FIG. 1B, client device 110 includes one or more processors, such as processor(s) 102. Processor(s) 102 may be any central processing unit ("CPU"), microprocessor, micro-controller, or computational device or circuit for executing instructions. Processor(s) are connected to a communication infrastructure 104 (e.g., a communications bus, cross-over bar, or network). Various software embodiments are described in terms of this exemplary client device 110. After reading this description, it will be apparent to one of ordinary skill in the art how to implement the method using client devices 110 that include other systems or architectures. One of ordinary skill in the art will understand that computers 34, 54 may have a similar and/or identical architecture as that of client devices 110. Put another way, computers 34, 54 can include some, all, or additional functional components as those of the client device 110 illustrated in FIG. 1B.

Client device 110 includes a display 168 that displays graphics, video, text, and other data received from the communication infrastructure 104 (or from a frame buffer not shown) to a user (e.g., a subscriber, commercial user, back-end user, or other user). Examples of such displays 168 include, but are not limited to, LCD screens, OLED display, capacitive touch screen, and a plasma display, to list only a few possible displays. Client device 110 also includes a main memory 108, such as a random access ("RAM") memory, and may also include a secondary memory 110. Secondary memory 110 may include a more persistent memory such as, for example, a hard disk drive ("HDD") 112 and/or removable storage drive ("RSD") 114, representing a magnetic tape drive, an optical disk drive, solid state drive ("SSD"), or the like. In some embodiments, removable storage drive 114 reads from and/or writes to a removable storage unit ("RSU") 116 in a manner that is understood by one of ordinary skill in the art. Removable storage unit 116 represents a magnetic tape, optical disk, or the like, which may be read by and written to by removable storage drive 114. As will be understood by one of ordinary skill in the art, the removable storage unit 116 may include a tangible and non-transient machine readable storage medium having stored therein computer software and/or data.

In some embodiments, secondary memory 110 may include other devices for allowing computer programs or other instructions to be loaded into client device 110. Such devices may include, for example, a removable storage unit ("RSU") 118 and a corresponding interface ("RSI") 120. Examples of such units 118 and interfaces 120 may include a removable memory chip (such as an erasable programmable read only memory ("EPROM")), programmable read only memory ("PROM")), secure digital ("SD") card and associated socket, and other removable storage units 118 and interfaces 120, which allow software and data to be transferred from the removable storage unit 118 to client device 110.

Client device 110 may also include a speaker 122, an oscillator 123, a camera 124, a light emitting diode ("LED") 125, a microphone 126, an input device 128, and a global positioning system ("GPS") module 129. Examples of input device 128 include, but are not limited to, a keyboard, buttons, a trackball, or any other interface or device through a user may input data. In some embodiment, input device 128 and display 168 are integrated into the same device. For example, display 168 and input device 128 may be touch-screen through which a user uses a finger, pen, and/or stylus to input data into client device 110.

Client device 110 also includes one or more communication interfaces 169, which allows software and data to be transferred between client device 110 and external devices such as, for example, another client device 110, a computer 34, 54 and other devices that may be locally or remotely connected to system 100. Examples of the one or more communication interfaces 169 may include, but are not limited to, a modem, a network interface (such as an Ethernet card or wireless card), a communications port, a Personal Computer Memory Card International Association ("PCMCIA") slot and card, one or more Personal Component Interconnect ("PCI") Express slot and cards, or any combination thereof. The one or more communication interfaces 169 may also include a wireless interface configured for short range communication, such as near field communication ("NFC"), Bluetooth, or other interface for communication via another wireless communication protocol. As briefly noted above, one of ordinary skill in the art will understand that computers 34, 54 and portions of system 100 may include some or all components of client device 110.

Software and data transferred via the one or more communications interfaces 169 are in the form of signals, which may be electronic, electromagnetic, optical, or other signals capable of being received by communications interfaces 169. These signals are provided to communications interface 169 via a communications path or channel. The channel may be implemented using wire or cable, fiber optics, a telephone line, a cellular link, a radio frequency ("RF") link, or other communication channels.

In this document, the terms "non-transitory computer program medium" and "non-transitory computer readable medium" refer to media such as removable storage units 116, 118, or a hard disk installed in hard disk drive 112. These computer program products provide software to client device 110. Computer programs (also referred to as "computer control logic") may be stored in main memory 108 and/or secondary memory 110. Computer programs may also be received via the one or more communications interfaces 169. Such computer programs, when executed by a processor(s) 102, enable the client device 110 to perform the features of the method discussed herein.

Figure 2:
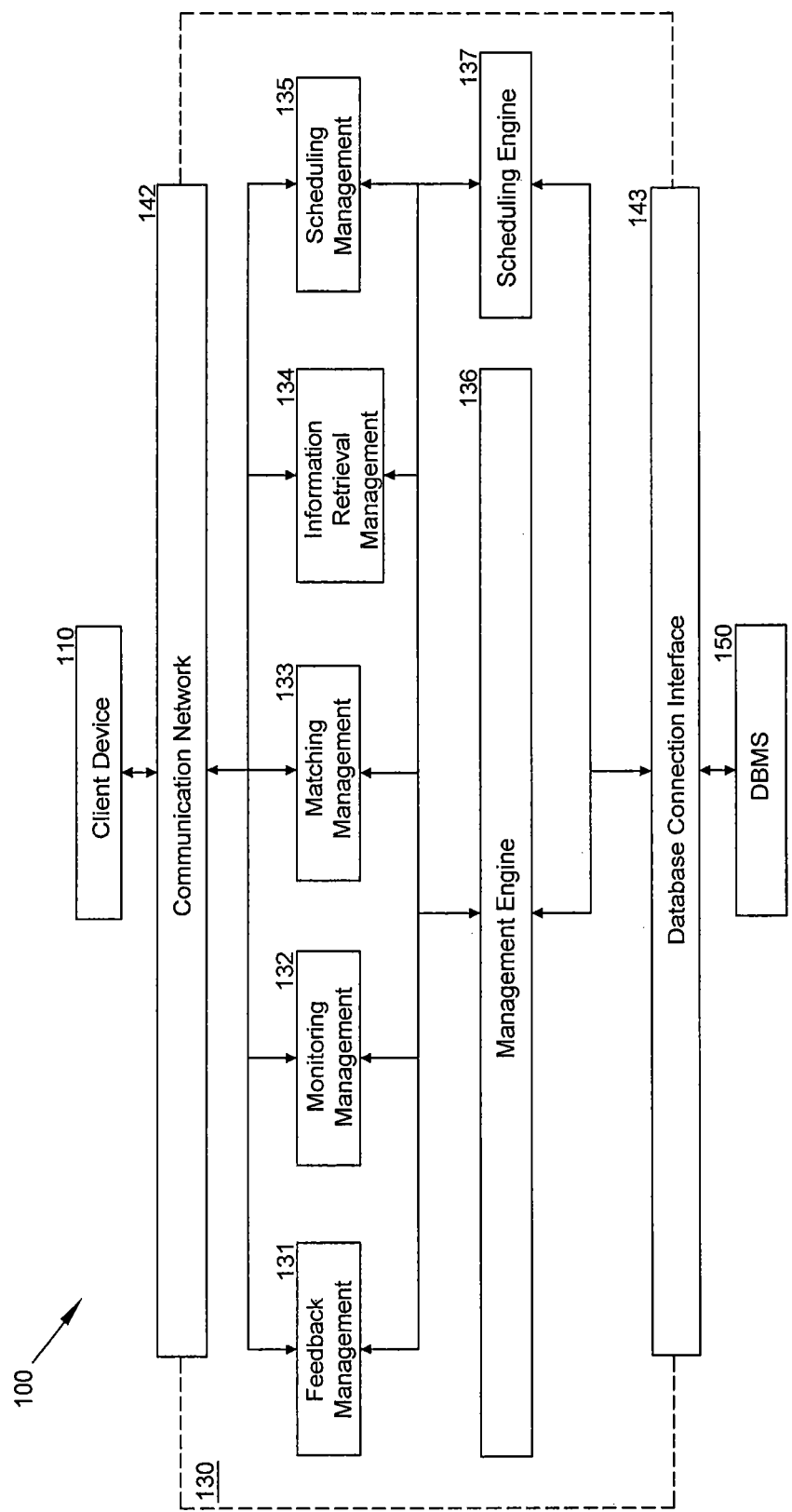
FIG. 2 illustrates one example of management server components in accordance with some embodiments of the present disclosure.

FIG. 2 is a diagram of system 100 management server 130 components in accordance with some embodiments of the present disclosure. System 100 may be a computing environment including one or more client devices 110, management server 130, one or more software management modules 131, 132, 133, 134, and 135, one or more software engines 136 and 137, database connection interface 143, database management system 150, and a communication network 142 connecting various components of system 100. Although one client device 110 is shown in FIG. 2, any number of client devices may be present. In various embodiments, client device 110 is a user device capable of connecting to the Internet or similar network as will be described below. In some embodiments, at least one device is a financial advisor client device 110-1 and a client user (e.g., customer, person seeking financial assistance, client of the financial advisor) client device 110-2.

In various embodiments, as shown in FIGS. 1A-1B and 2, client device 110 may include a computing device such as a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), or any other suitable computing device configured to store data and software instructions, execute software instructions to perform operations, and/or display information on a display device. Client device 110 may be associated with one or more users (not shown). For example, a user operates client device 110, causing it to perform one or more operations in accordance with various embodiments.

Client device 110 includes one or more tangible, non-transitory memories that store data and/or software instructions, and one or more processors configured to execute software instructions. Client device 110 may include one or more display devices that display information to a user and one or more input devices (e.g., keypad, keyboard, touchscreen, voice activated control technologies, or any other suitable type of known input device) to allow the user to input information to the client device. Client device 110 processor(s) may be any central processing unit ("CPU"), microprocessor, micro-controller, or computational device or circuit for executing instructions. Processor(s) are connected to a communication infrastructure (e.g., a communications bus, cross-over bar, or network). Various software embodiments are described in terms of this exemplary client device 110. After reading this description, it will be apparent to one of ordinary skill in the art how to implement the method using client device 110 that include other systems or architectures. One of ordinary skill in the art will understand that computers may have a similar and/or identical architecture as that of client device 110. Put another way, computers can include some, all, or additional functional components as those of the client device 110 illustrated in FIGS. 1A-1B and 2.

Client device 110 also includes one or more communication interfaces 169, which allows software and data to be transferred between client device 110 and external devices such as, for example, another client device 110, a computer, management server 130, and other devices that may be locally or remotely connected to client device 110. Examples of the one or more communication interfaces may include, but are not limited to, a modem, a network interface (e.g., communication interface 169, such as an Ethernet card or wireless card), a communications port, a Personal Computer Memory Card International Association ("PCMCIA") slot and card, one or more Personal Component Interconnect ("PCI") Express slot and cards, or any combination thereof. The one or more communication interfaces 169 may also include a wireless interface configured for short range communication, such as near field communication ("NFC"), Bluetooth, or other interface for communication via another wireless communication protocol.

Software and data transferred via the one or more communications interfaces 169 are in the form of signals, which may be electronic, electromagnetic, optical, or other signals capable of being received by communications interfaces. These signals are provided to communications interface 169 via a communications path or channel. The channel may be implemented using wire or cable, fiber optics, a telephone line, a cellular link, a radio frequency ("RF") link, or other communication channels.

In an embodiment where the system 100 or method is partially or entirely implemented using software, the software may be stored in a computer program product and loaded into client device 110 using removable storage drive, hard drive, and/or communications interface. The software, when executed by processor(s), causes the processor(s) to perform the functions of the method described herein. In another embodiment, the method is implemented primarily in hardware using, for example, hardware components such as application specific integrated circuits ("ASICs"). Implementation of the hardware state machine so as to perform the functions described herein will be understood by persons skilled in the art. In yet another embodiment, the method is implemented using a combination of both hardware and software.

Embodiments of the subject matter described in this specification can be implemented in a system 100 that includes a back end component, e.g., as a data server, or that includes a middleware component, e.g., an application server, or that includes a front end component (e.g., a client device 110) having a graphical user interface or a Web browser through which a user can interact with an implementation of the subject matter described is this specification, or any combination of one or more such back end, middleware, or front end components. The components of the system can be interconnected by any form or medium of digital data communication, (e.g., a communication network 142). Communications network 142 may include one or more communication networks or media of digital data communication. Examples of communication network 142 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet and combinations thereof. In accordance with various embodiments of the present disclosure, communications network 142 may include the Internet and any publicly accessible network or networks interconnected via one or more communication protocols, including, but not limited to, hypertext transfer protocol (HTTP) and HyperText Transfer Protocol Secured (HTTPS) and Secured Socket Layer/Transport Layer Security (SSL/TLS) and transmission control protocol/internet protocol (TCP/IP). Communications protocols in accordance with various embodiments also include protocols facilitating data transfer using radio frequency identification (RFID) communications and/or NFC. Moreover, communications network 142 may also include one or more mobile device networks, such as a GSM or LTE network or a PCS network, allowing a client device to send and receive data via applicable communications protocols, including those described herein. For ease of illustration, communication network 142 is shown as an extension of management server 130.

A client device 110 and server 130 are generally remote from each other and typically interact through a communication network 142. The relationship of client device 110 and management server 130 arises by virtue of computer programs running on the respective system components and having a client-server relationship to each other. System 100 may include a web/application server (not shown) in embodiments used to gain access to many services provided by management server 130.

In one aspect, client device 110 stores in memory one or more software applications that run on the client device and are executed by the one or more processors. In some instances, each client device stores software applications that, when executed by one or more processors, perform operations that establish communications with management server 130 (e.g., across communication network 142 via communication interface 169) and that obtain, from management server 130, information or data via database management system 150 in accordance with various embodiments.

In various embodiments, client device 110 may execute stored software application(s) to interact with management server 130 via a network connection. The executed software applications may cause client device 110 to communicate information (e.g., financial advisor identification information, financial advisor scheduling information, questionnaires, reminders/notifications, etc.). As described below, executed software applications (s) may be configured to allow a user associated with client device 110 to initiate a request for financial advisor, receive and identify a financial advisor associated with request, and provide feedback associated with the identified financial advisor. Stored software application(s) on client device 110 are configured to access webpages on the Internet or other suitable network based communication capable of interacting with communication network 142, as would be understood by one of ordinary skill in the art. For example, a user may access a user account on management server 130 via an Internet webpage. In this example, management server 130 is configured to render the Internet webpage for the user on client device 110. Alternatively, management server 130 may provide information to stored software application(s) on client device 110 via communication network 142. In this example, client device 110 will display information provided by management server 130 using a stored software application(s) graphical user interface display. In the example above, a respective user account may be associated with a financial advisor, client user, or supervisor/monitoring authority as would be understood by one of ordinary skill in the art and described below.

According to various embodiments, system 100 includes database management system/storage 150 for managing and storing data, such as financial advisor identities and statistics, historical client data, matching criteria and statistics, success factors, and other data maintained by the management server 130. The database management system and/or storage are referred to herein simply as DBMS 150 for convenience. DBMS 150 is communicatively coupled with various modules and engines as illustrated in FIGS. 1A-1B and 2.

It should be understood that various forms of data storage or repositories can be used in system 100 that may be accessed by a computing system, such as hard drives, tape drives, flash memory, random-access memory, read-only memory, EEPROM storage, in-memory databases like SAP HANA, and so on, as well as any combination thereof. Stored data may be formatted within data stores in one or more formats, such as flat text file storage, relational databases, non-relational databases, XML, comma-separated values, Microsoft Excel files, or any other format known to those of ordinary skill in the art, as well as any combination thereof as is appropriate for the particular use. Data stores may provide various forms of access to the stored data, such as by file system access, network access, a SQL protocol (e.g. ODBC), HTTP, FTP, NES, CIFS, and so on, as well as any combination thereof.

According to various embodiments, client device 110 is configured to access DBMS 150 via management server 130. In various embodiments, DMBS 150 is configured to maintain a database schema. As will be described in further detail below, database schema 180 is configured to maintain a plurality of identifiers associated with specific categories of records. For example, database schema may be arranged to maintain identifiers in columns within DBMS 150 associated with financial advisor records, client user records, financial instrument records, various home office records, notification records, scheduling records, monitoring records, feedback records, information questionnaire records, and navigation/location records. In this aspect, identifiers refer to specific information pertaining to the categories described above. By way of example, a financial advisor record category may include identifiers pertaining to the location, success rate, and/or expertise of a respective financial advisor. Database schema 180 within DMBS 150 may be arranged or organized in any suitable manner within the system. Although the above described examples identify categorical identifiers, any number of suitable identifiers may be used to maintain records associated with the system described herein. In addition, a database schema may contain additional categories and identifiers not described above for maintaining record data in system 100. The database can also provide the information of performance evaluation for financial advisors.

The database schema described above advantageously organizes identifiers in a way that permits the system to operate more efficiently. In some embodiments, categories of identifiers in the database schema increase efficiency by grouping identifiers with an associated management model of management server 130.

In various embodiments, management server 130 includes computing components configured to store, maintain, and generate data and software instructions. For example, management server 130 may include or have access to one or more processors 24, one or more servers (not shown) and tangible, non-transitory memory devices (e.g., local data store (in addition to DBMS 150)) for storing software or code for execution and/or additional data stores. Servers may include one or more computing devices configured to execute software instructions stored on to perform one or more processes in accordance with various embodiments. In some embodiments, DBMS 150 includes a server that executes software instructions to perform operations that provide information to at least one other component of computing environment 100, for example providing data to another data store or to third party recipients (e.g., third party vendors, information gathering institutions, etc.) through a network, such as a communication network 142.

Management server 130 may be configured to provide one or more websites, digital portals, or any other suitable service that is configured to perform various functions of management server 130 components. In some embodiments, management server 130 maintains application programming interfaces (APIs) through which the functionality and services provided by server 130 may be accessed through one or more application programs executed by a client device 110. Exemplary services and systems provided by management server 130 include feedback management 131, monitoring management 132, matching management 133, information retrieval management 134, and scheduling management 135, each of which is described in further detail below. In various embodiments, management server 130 may provide information to software application(s) on client device 110 for display on a graphical user interface 168.

In some embodiments, management server 130 provides information to client device 110 (e.g., through the API associated with the executed application program). Client device 110 presents portions of the information to corresponding users through a corresponding respective graphical user interface 168 or webpage.

In various embodiments, management server 130 is configured to provide or receive information associated with services provided by management server 130 to client device 110. For example, client device 110 may receive information via communication network 142, and store portions of the information in a locally accessible store device and/or network-accessible storage devices and data stores (e.g., cloud-based storage). For example, client device 110 executes stored instructions (e.g., an application program, a web browser, and/or a mobile application) to process portions of stored data and render portions of the stored data for presentation to the respective user or users. Management server 130 may include additional servers (not shown) which may be incorporated as a corresponding node in a distributed network or as a corresponding networked server in a cloud-computing environment. Furthermore, servers may communicate via communication network 142 with one or more additional servers (not shown), that may facilitate the distribution of processes for parallel execution by the additional servers.

In further aspects, management server 130 may represent a "controlling entity" capable of storing, managing, distributing, and safeguarding information (e.g., matching algorithm, monitoring information, feedback information, client user information, etc.) in accordance with various embodiments.

The present disclosure describes an embedded matching system and methods for that aiding potential clients, financial advisors and asset management service providers to effectively match potential client users with financial advisors for financial assistance and guidance services. The systems and methods described throughout this disclosure enable financial advisors and potential clients to use client devices 110 from any location to match based on a plurality of information, described in further detail below. Furthermore, the matching algorithm described herein, is configured to receive feedback data from the users and/or financial advisors and update the algorithm for improved matching capabilities. In various embodiments, management system 130 is configured to provide front end (e.g., client user applications, branch office interface/financial advisor applications, and home office monitoring interface applications) and back end (e.g., comprehensive databases and a machine learning matching algorithm(s)) components in order to effectively and efficiently provide feedback for improved client user and financial advisor matches, home office monitoring and tracking, and meeting scheduling, performance evaluation and message delivering.

Workflow Management

Figure 3:
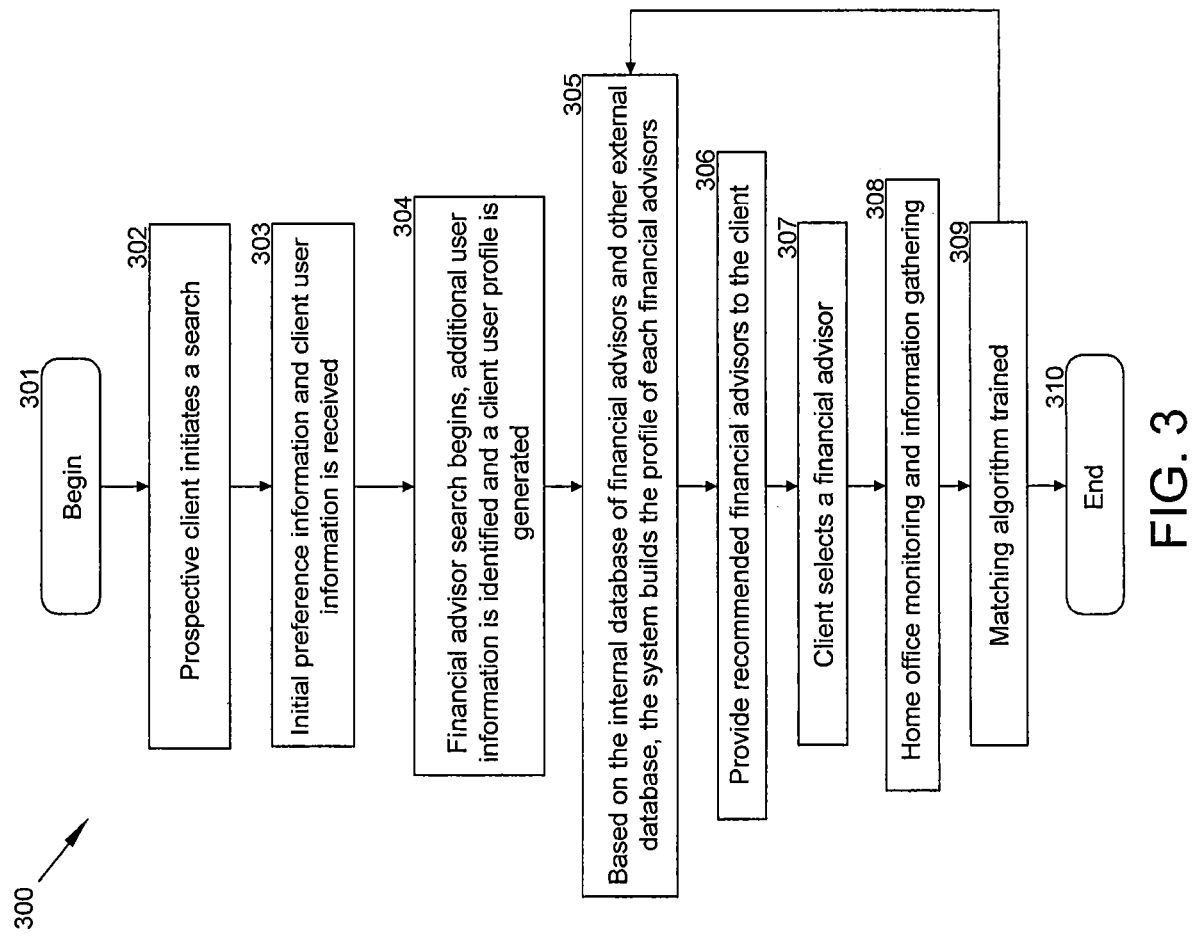
FIG. 3 is a flow diagram illustrating an example prospective client matching process 300 in accordance with some embodiments of the present disclosure.

FIG. 3 is a flow diagram illustrating an example prospective client matching process 300 in accordance with some embodiments of the present disclosure. The process 300 allows a prospective client to match with a financial advisor based on search criteria and attributes of both parties, as well as intelligently improve the matching algorithm. At step 302, a prospective client initiates a search for a financial advisor via client device 110. At step 303, management server 130 is configured to receive prospective client information associated with the search for a financial advisor. According to various embodiments, prospective client information may include initial preference information (e.g., financial needs, life stage, demographics, occupation), geographic location, asset information and/or customer experience index. In some embodiments, management server 130 is configured to receive and process information received from the client user via information retrieval management 134. In various embodiments, information retrieval management 134 is configured to receive information via questionnaires generated by management server 130 to client device 110. In some embodiments, management server 130 may retrieve client information from social media data, external databases, geographic location (e.g., GPS), live chat, and/or cookies. One of ordinary skill in the art will appreciate that management server 130 may retrieve client information from a variety of sources that may be used to match a prospective client with a financial advisor. In various embodiments, a user profile is generated based on the client information received by management server 130. In some embodiments, a user profile is associated with a user account associated with management server 130.

At 304, client information received by management server 130 is processed and a financial advisor search begins. In various embodiments, additional client information may be identified and retrieved by management server 130. In some embodiments, additional client information is identified and retrieved by management server 130 via information retrieval management 134.

At 305, management server 130 is configured to identify a plurality of financial advisors using financial advisor information. In various embodiments, financial advisor information is stored in DBMS 150. Financial advisor information may comprise financial advisor data, probable maximum loss information, preferred client types, financial product mix, technology used, geographic location, professional certifications, hobbies, schools, family information, assets under care, client satisfaction, etc. One of ordinary skill in the art will understand that financial advisor information may include any relevant information that can assist in matching a prospective client with a financial advisor. In various embodiments, management server 130 generates a financial advisor profile based on financial advisor information. In various embodiments, financial advisor information is retrieved from an external database 56 or computer system network 50 via communication network 142.

At 306, management server 130 is configured to identify and display a first set of financial advisors. In various embodiments, the first set of financial advisors is determined based on inputs comprising client information and financial advisor information using a matching algorithm. In some embodiments, the first set of financial advisors is determined based on inputs comprising client information, financial advisor information, and additional client assessment/satisfaction information that will be discussed in further detail below. In some embodiments, management engine 136 of management server 130 processes information from information retrieval management 134 (e.g., client user information) and DBMS 150 (e.g., financial advisor information). In various embodiments, management engine 136 comprises a matching algorithm used to match prospective clients with a respective financial advisor. In this example, management engine 136 is configured to identify a first set of financial advisors via a matching algorithm using a plurality of management server 130 components. Management engine 136 is configured to communicate matching algorithm results to client device 110 via matching management 133. In some embodiments, the matching algorithm will generate a highest success rating or match/fit indicator used to identify a first set of financial advisors based on historical client and financial advisor profile information and prospect client information. One of ordinary skill in the art will understand that a matching algorithm can generate a variety of values that can be associated with identifying a plurality or subset of financial advisors. For example, a scoring algorithm may be used that assigns points to attributes of the financial advisors as a function of how closely they match the attributes of a prospective client, e.g., the college a financial advisor attended may be assigned 10 points if it matches the college attended by the prospective client, and it may be assigned zero points if the prospective client did not go to college. The financial advisor with the highest cumulative score may be deemed to be the "best fit" for that prospective client. In various embodiments, the assigned points are attributes and may be different due to the success factors. For example, if the success factor is weighed more toward assets under care of the financial advisor, then the current number of high net wealth household clients may have a higher assigned point total than the attribute identifying a client's online access total. Online access might be an important drive for the higher client satisfaction, but not be an important driver for client asset under care in this example.

The matching algorithm can also receive feedback from clients and outside sources to make adjustments. For example, in the scoring algorithm discussed above, it may be determined that when a financial advisor and a client belong to the same country club, the financial relationship and satisfaction between the client and financial flourishes. In response the scoring algorithm may automatically increase the number of points assigned to a financial advisor when he is a member of the same country club as a prospective client. Using these types of relationships, the matching algorithm can develop "ideal profiles" for financial advisors and prospective clients. In other words, a prospective client may be the "best fit" when he/she matches the ideal profile associated with a particular financial advisor. For example, a financial advisor may be most successful with widowed women over the age of 65, with assets in the range of $250,000-$500,000 who receive social security benefits and own their own home. This type of client would be deemed to meet the financial advisor's "ideal profile" and thus the scoring algorithm would assign extra points to this financial advisor.

At 307, a client user selects via client device 110 a financial advisor from the first set of financial advisors identified by management server 130. At 307, the home office monitors relationship information between the client user and financial advisor. In various embodiments a home office is a supervisory or management entity for the financial advisor. In some embodiments, the home office may be considered the branch office, regional office, or corporate headquarters office for a respective financial advisor.

In various embodiments, management server 130 is configured to monitor relationship information for feedback into the matching algorithm. In some embodiments, relationship information may include the success of assets under care, tenure with the financial advisor, client satisfaction, accounts opened, appointments scheduled, client attrition, etc. Management server 130 is configured to monitor a plurality of client relationship information between client users and respective financial advisors. In some embodiments, management server 130 monitors relationship information via monitoring management 132. In this example, monitoring management 132 monitors relationship information without user interaction, by monitoring performance attributes of the client user and financial advisor relationship. In various embodiments, relationship information is identified via a questionnaire or form generated by management server 130 and submitted by the client user and/or financial advisor on client device 110, as discussed below.

At step 309, financial advisor relationship information is used to train the matching algorithm by updating financial advisor information in DBMS 150. In various embodiments, a plurality of financial advisor information is variable and updated via relationship information. In some embodiments, relationship information is identified automatically based on performance between a client user and a respective financial advisor. In various embodiments, relationship information may be identified via a questionnaire or form. One of ordinary skill in the art will understand that relationship information can be determined in a variety of different ways to update financial advisor information in order to improve the client user financial advisor match by training the matching algorithm.

According to various embodiments, the matching algorithm is initially built based on historical client information and financial advisor information to identify the impacts of different factors on success of the client-financial advisor match. By way of example, success of the client-financial advisor match may be identified by evaluating assets under care, tenure with the financial advisor, satisfaction of the client. It should be appreciated that as new clients interact with a financial advisor, information is collected over time. Thus, the matching algorithm will constantly monitor the clients' feedback and variable factors, updating the matching algorithm and intelligently improving the matching results over time. In various embodiments, examples of relationship and/or feedback information may include tracking how many appointments have been scheduled, feedback from new clients, how many accounts have been open, how many assets have been under care, how many products have been used, how satisfied the client is, client attrition, client referral over time, client portfolio outcomes, and how often the client engages with digital properties (e.g., logging in to online access, adding linked accounts to online access, etc.). In various embodiments, the success factor may change based on the business objectives.

In various embodiments, management server 130 is configured to generate notifications on a respective client device 110 when a prospective client and a financial advisor are co-located (e.g., in the same geographic location) with each other. For example, if a financial advisor that would identify as a successful match, as determined by the matching algorithm, is co-located in the same vicinity of a prospective client, management server 130 is configured to generate a notification or alert on a prospective client or financial advisor client device. In this example, management server 130 identifies the geographic location of each client device via GPS or similar tracking means and provides notifications for initiating and selecting the financial advisor with the co-located client device belonging to the respective financial advisor. In various embodiments, management server 130 is configured to permit the prospective client to initiate a prospective client scheduling process 400, described in more detail below, when notifications are generated for co-located client devices.

Figure 4:
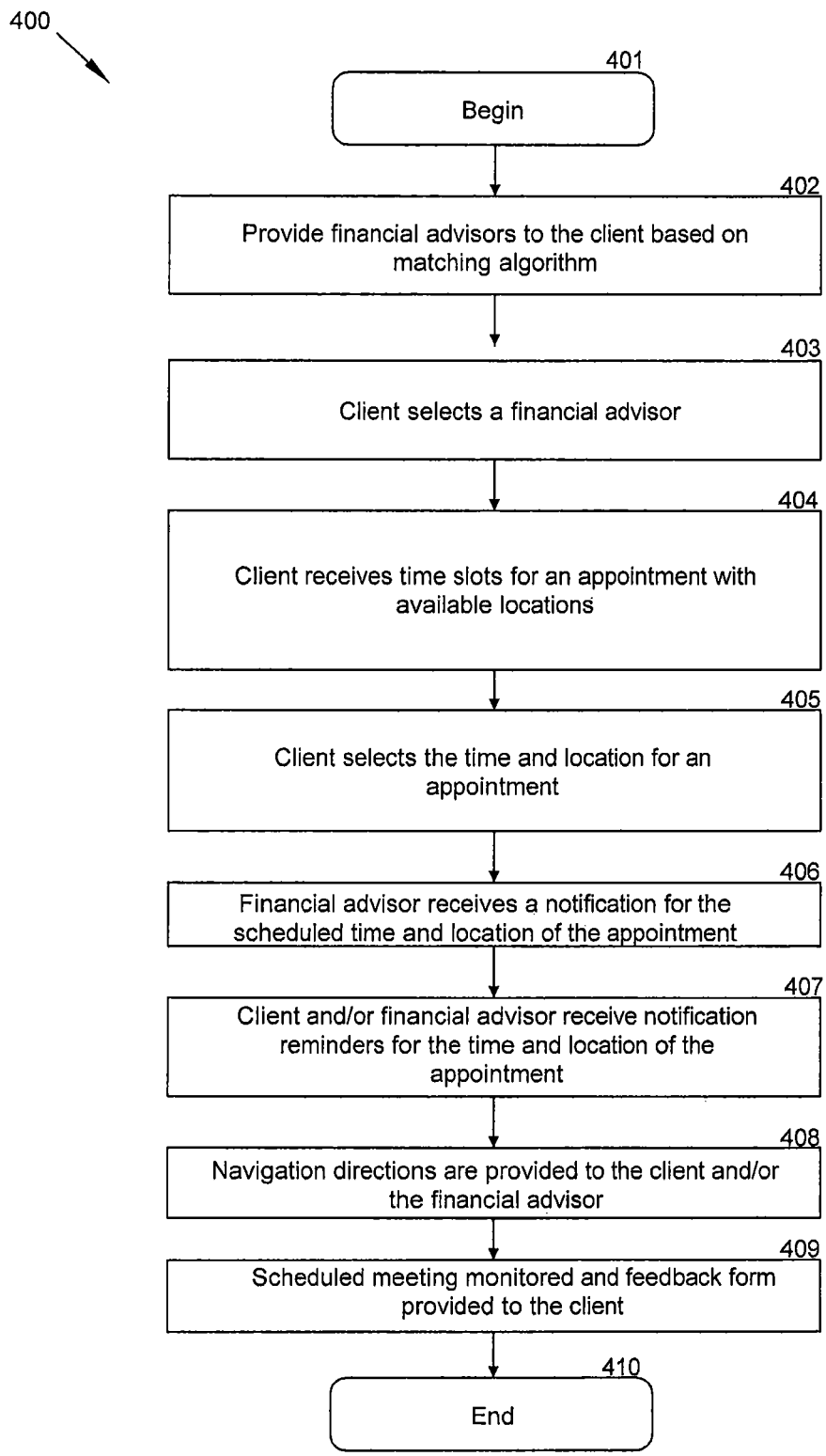
FIG. 4 is a flow diagram illustrating an example prospective client scheduling process 400, in accordance with some embodiments of the present disclosure.

FIG. 4 is a flow diagram illustrating an example prospective client scheduling process 400, in accordance with some embodiments of the present disclosure. According to various embodiments, management server 130 is configured to schedule appointments for prospective clients with a respective financial advisor. Prospective client scheduling process 400 describes an embodiment where management server 130 provides scheduling parameters to the client upon selection of a financial advisor. At step 402, management server 130 provides a first set of financial advisors to the client based on the matching algorithm, using embodiments described above. At step 403, the client selects a financial advisor from a plurality of financial advisors identified from the matching algorithm results.

At step 404, management server 130 is configured to generate and display available time slots and locations for an appointment with the selected financial advisor. In some embodiments, management server 130 coordinates scheduling appointments by deconflicting with a financial advisor's schedule via scheduling management 135. For example, a financial advisor's schedule may be stored on DBMS 150 and accessed via scheduling management 135. At step 405, the client selects the time and location for an appointment via client device 110. In some embodiments, scheduling engine 137 is configured to process scheduling requests and generate notifications to respective client devices when an appointment has been scheduled. At step 406, the selected financial advisor receives a notification for the scheduled time and location of the appointment. At step 407, the client and/or financial advisor receive notification reminders for the time and location of the appointment. In various embodiments, scheduling management 135 is configured to generate notifications for scheduled appointments on client devices 110. At step 408, navigation directions are provided to the client and/or financial advisor associated with the scheduled appointment location. At step 409, management server 130 is configured to generate a feedback form (e.g., questionnaire) associated with the scheduled appointment for use in the feedback management 131 for updating the matching algorithm. In some embodiments, management server 130 is further configured to generate and deliver messages between financial advisors and prospective clients.

In various embodiments, management server 130 is configured to push new product notifications and customized advertisement messages to client devices via an engagement management (not shown). In this example, financial and investment products such as life insurance, may be pushed to a client device based on historical information identified and stored in DBMS 150 and/or identified by the matching algorithm as successful for a particular type of client. In some embodiments, relationship information described above may be used to identify marketing attributes based on client information. For example, relationship information may push notifications of financial instruments that are identified or would be of a particular good fit based on identified client information. In other words, a financial advisor receives information on financial instruments that have been identified as successful based on relationship information.

In various embodiments, management server 130 is configured to initiate a search of DBMS 150 to identify financial advisor attributes, success factors, and/or specific or trend information for financial advisors and clients. In some embodiments, the search of DBMS may be used by a call center to assist in client/financial advisor matching. For example, an internal business department may receive a call from current or potential investors for more information as they search for a financial advisor. In this example, a search may be executed with the matching algorithm to identify a financial advisor. In some embodiments, the search may include a search for particular attributes (e.g., demographics, distance from the branch, age, sex, etc.) that may be used to assist in matching a potential client with a financial advisor. In other embodiments, the search is based solely on attributes provided by the potential client, and the matching algorithm automatically identifies suitable financial advisors.

In describing the systems and methods above, it should be appreciated that the system advantageously identifies why particular financial advisors are more successful in creating and retaining clients because the algorithm learns over time. This information about particular financial advisors' style, communication approach, areas of specialty, and a wide variety of factors can provide business intelligence in many potential and unforeseen ways. For example, the system and methods may inform qualities or traits that assist in determining which new financial advisors are hired, which products are popular and successful, product development and design, which markets to build new offices in, as well as uncover un-met client needs and potential new lines of business. By way of example, using measurable "hard data" such as assets and portfolio outcomes, it can be used to identify the relationship skills and how they affect the correlation between investor satisfaction and advisor success measurements. Furthermore, this correlation could result in creating new performance metrics (e.g., financial attributes, client attributes, success factors, etc.) for the business.

In one embodiment, the present disclosure can be used for monitoring client and financial advisor interactions and determining profiles that are not based solely on correlations between financial advisors and their clients. For example, the present disclosure can be used to identify correlations between financial advisors and financial products. For examples metrics can be developed to evaluate the performance of a financial advisor based on the performance of a particular financial instrument across many clients of the financial advisor. Thus, a particular financial advisor may be identified with a particular financial product, e.g. annuities, as part of the financial advisor's "profile" based on client satisfaction, performance of the financial product, achievement of client goals, etc.

Likewise, the present disclosure can be used for monitoring client and financial advisor interactions and determining metrics useful for predicting performance. For example, by collecting data from clients regarding satisfaction with their current financial advisor, common traits may be identified for a financial advisor that are driving the client's perception. This trait then can be used to identify a metric that may be useful in matching financial advisors with potential clients. For example, several clients may identify that they are very satisfied with a particular financial advisor because he encourages investment in socially responsible companies. A metric can then be developed to learn the level of interest of potential clients in investing in socially responsible companies. This metric can be utilized by the matching algorithm in determining the best fit as discussed above, of a financial advisor with a potential client.

The present disclosure can be embodied in the form of methods and apparatus for practicing those methods. The present disclosure can also be embodied in the form of program code embodied in tangible media, such as secure digital ("SD") cards, USB flash drives, diskettes, CD-ROMs, DVD-ROMs, Blu-ray disks, hard drives, or any other non-transitory machine-readable storage medium, wherein, when the program code is loaded into and executed by a machine, such as a computer, the machine becomes an apparatus for practicing the disclosure. The present disclosure can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

It may be emphasized that the above-described embodiments, are merely possible examples of implementations, and merely set forth a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

While this specification contains many specifics, these should not be construed as limitations on the scope of any disclosure or of what may be claimed, but rather as descriptions of features that may be specific to particular embodiments of particular disclosures. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

While various embodiments have been described, it is to be understood that the embodiments described are illustrative only and that the scope of the subject matter is to be accorded a full range of equivalents, many variations and modifications naturally occurring to those of skill in the art from a perusal hereof.

What is claimed is:

1. A non-transitory computer readable medium having computer-executable instructions embodied thereon, wherein, when executed by a processor, the computer-executable instructions cause the processor to:
   communicatively couple to a plurality of client devices that are accessible by an initial user to enable the user to communicate with the processor;
   provide a graphical user interface to each of the plurality of client devices, wherein each of the plurality of client devices is configured to display the graphical user interface;
   receive an initial request from one of the plurality of client devices, the initial request being a request for a financial advisor;
   receive a first initial set of information associated with the initial user of the client device making the initial request;
   receive an initial second set of information associated with financial advisors as a function of the first initial set of information;
   identify, using a machine learning matching algorithm, a plurality of initial financial advisors as a function of the initial first and initial second sets of information, wherein the machine learning matching algorithm determines a location of the initial user of the client device making the request based at least in part on a global positioning system signal, and wherein the machine learning matching algorithm is comprised in a management engine;
   generate notifications based at least in part on a proximity of the client device making the request to a collocated client device;
   display the identified initial plurality of financial advisors on the graphical user interface;
   receive a selection for a financial advisor among the displayed initial plurality of financial advisors from the initial user;
   receive a third set of information associated with the selected financial advisor, wherein the third set of information is generated from a scoring algorithm developed using performance attributes based on the relationship between the initial user, financial advisor, and historical financial advisor relationship information;
   train the machine learning matching algorithm to modify the initial second set of financial advisor information as a function of the third set of information, thereby producing a revised second set of financial advisor information;
   receive an additional request from an additional client device that is accessible by an additional user for an additional financial advisor;
   receive a first additional set of information associated with the additional user of the client device making the additional request;

identify, using the machine learning matching algorithm, an additional plurality of additional financial advisors as a function of the additional first and revised second sets of information; and display the identified additional plurality of financial advisors on an additional graphical user interface provided to the additional client device; and wherein a plurality of baseline financial advisors identified using the machine learning matching algorithm as a function of the additional first and the initial second sets of information is unequal to the plurality of additional financial advisors.

2. The non-transitory computer readable medium of claim 1, wherein the first set of information comprises at least one of assets, financial need, life stage, demographics, lifestyle, hobbies, financial goal, social media information, house ownership, school attended, or location.

3. The non-transitory computer readable medium of claim 1, wherein the second set of information comprises at least one of financial advisor expertise, professional designation, financial advisor tenure, number of clients, education, school attended, probability of maximum loss, location, or performance.

4. The non-transitory computer readable medium of claim 1, wherein the third set of information comprises at least one of client satisfaction, client attrition or assets under care.

5. The non-transitory computer readable medium of claim 1, wherein one or more of the plurality of client devices comprises a wearable computing device.

6. The non-transitory computer readable medium of claim 1, wherein the identified plurality of financial advisors correlates to a best fit match determined by the machine learning matching algorithm.

7. The non-transitory computer readable medium of claim 1, wherein the computer-executable instructions further cause the processor to display a business location associated with the selected financial advisor.

8. The non-transitory computer readable medium of claim 1, wherein the computer-executable instructions further cause the processor to display available meeting times associated with a calendar of the selected financial advisor.

9. The non-transitory computer readable medium of claim 1, wherein the computer-executable instructions further cause the processor to guide the user to schedule an appointment or make a phone call on the client device.

10. The non-transitory computer readable medium of claim 1, wherein the computer-executable instructions further cause the processor to provide monitoring of the machine learning matching algorithm performance and statistics.

11. A system comprising:
a server comprising:
  a memory for storing computer readable code; and
  a processor operatively coupled to the memory, the processor configured to:
    communicatively couple to a plurality of client devices that are accessible by an initial user to enable the initial user to communicate with the server;
    provide a graphical user interface to each of the plurality of client devices, wherein each of the plurality of client devices is configured to display the graphical user interface;
    receive an initial request from one of the plurality of client devices, the initial request being a request by a user for a financial advisor;
    receive a first initial set of information associated with the initial user of the client device making the initial request;
    receive an initial second set of information associated with financial advisors as a function of the first initial set of information;
    identify, using a machine learning matching algorithm, a plurality of initial financial advisors as a function of the initial first and initial second sets of information, wherein the machine learning matching algorithm determines a location of the initial user of the client device making the request based at least in part on a global positioning system signal, and wherein the machine learning matching algorithm is comprised in a management engine;
    generate notifications based at least in part on a proximity of the client device making the request to a collocated client device;
    display the identified initial plurality of financial advisors on the graphical user interface;
    receive a selection for a financial advisor among the displayed initial plurality of financial advisors from the initial user;
    in response to receiving a selection for a financial advisor:
      display for selection a business location associated with the selected financial advisor;
      display available meeting times associated with a calendar of the selected financial advisor;
      guide the at least one user to schedule an appointment or make a phone call on the client device;
    receive a third set of information associated with the selected financial advisor, wherein the third set of information is generated from a scoring algorithm developed using performance attributes based on the relationship between the initial user, financial advisor, and historical financial advisor relationship information;
    train the machine learning matching algorithm to modify the initial second set of financial advisor information based on the the third set of information, thereby producing a revised second set of financial advisor information;
    receive an additional request from an additional client device that is accessible by an additional user for an additional financial advisor;
    receive a first additional set of information associated with the additional user of the additional client device making the additional request;
    identify, using the machine learning matching algorithm, an additional plurality of additional financial advisors as a function of the additional first and revised second sets of information; and
    display the identified additional plurality of financial advisors on an additional graphical user interface provided to the additional client device; and
    wherein a plurality of baseline financial advisors identified using the machine learning matching algorithm as a function of the additional first and the initial second sets of information is unequal to the plurality of additional financial advisors.

12. The system of claim 11, wherein the second set of information comprises performance information associated with the at least one user and selected financial advisor.

13. The system of claim 11, wherein in response to receiving a selection for a financial advisor the processor is further configured to: notify the selected financial advisor associated with the request when the client device has entered a predetermined geographical area associated with the location of the financial advisor.

14. The system of claim 11, wherein in response to training the machine learning matching algorithm, the server is configured to process subsequent requests associated with a request for a financial advisor using the trained machine learning matching algorithm.

15. The system of claim 11, wherein the first set information comprises at least one of assets, financial need, life stage, demographics, or location.

16. The system of claim 11, wherein the third set information comprises at least one of probable maximum loss, location, or performance.

17. The system of claim 11, wherein the third set information comprises at least one of client satisfaction, account opened, appointments set up, assets under care, or attrition.

18. The system of claim 11, wherein one or more of the plurality of client devices comprises a wearable computing device.

19. The system of claim 11, wherein the server is configured to provide monitoring of the machine learning matching algorithm performance and statistics.

20. A method comprising:
    providing a graphical user interface to each of a plurality of client devices that are accessible by an initial user, wherein each of the plurality of client devices is configured to display the graphical user interface;
    receiving, at a processor, an initial request from one of the plurality of client devices, the initial request being a request for a financial advisor;
    receiving, at the processor, a first initial set of information associated with the initial user of the client device making the initial request;
    receiving, at the processor, an initial second set of information associated with financial advisors as a function of the first initial set of information;
    identifying, at the processor, using a machine learning matching algorithm, a plurality of initial financial advisors as a function of the initial first and initial second sets of information, wherein the machine learning matching algorithm determines a location of the initial user of the client device making the request based at least in part on a global positioning system signal, and wherein the machine learning matching algorithm is comprised in a management engine;
    generating, at the processor, notifications based at least in part on a proximity of the client device making the request to a collocated client device;
    displaying the identified initial plurality of financial advisors on the graphical user interface;
    receiving, at the processor, a selection for a financial advisor among the displayed initial plurality of financial advisors from the initial user;
    receiving, at the processor, a third set of information associated with the selected financial advisor, wherein the third set of information is generated from a scoring algorithm developed using performance attributes based on the relationship between the initial user, financial advisor, and historical financial advisor relationship information;
    training the machine learning matching algorithm to modify the initial second set of financial advisor information as a function of the third set of information, thereby producing a revised second set of financial advisor information;
    receiving an additional request from an additional client device that is accessible by an additional user for an additional financial advisor;
    receiving a first additional set of information associated with the additional user of the client device making the additional request;
    identifying, using the machine learning matching algorithm, an additional plurality of additional financial advisors as a function of the additional first and revised second sets of information; and
    displaying the identified additional plurality of financial advisors on an additional graphical user interface provided to the additional client device; and
    wherein a plurality of baseline financial advisors identified using the machine learning matching algorithm as a function of the additional first and the initial second sets of information is unequal to the plurality of additional financial advisors.

* * * * *